US010800519B2

(12) United States Patent
Tearne et al.

(10) Patent No.: US 10,800,519 B2
(45) Date of Patent: Oct. 13, 2020

(54) COLLAPSIBLE FLYING DEVICE

(71) Applicant: SPIN MASTER LTD., Toronto (CA)

(72) Inventors: Daryl R. Tearne, Toronto (CA);
Robert M. O'Brien, Ajax (CA);
Charles Sink, Friday Harbor, WA (US)

(73) Assignee: SPIN MASTER LTD., Toronto, Ontario (CA)

( * ) Notice: Subject to any disclaimer, the term of this patent is extended or adjusted under 35 U.S.C. 154(b) by 0 days.

(21) Appl. No.: 16/138,017

(22) Filed: Sep. 21, 2018

(65) Prior Publication Data

US 2019/0367164 A1 Dec. 5, 2019

Related U.S. Application Data

(62) Division of application No. 15/992,038, filed on May 29, 2018, now Pat. No. 10,106,252.

(51) Int. Cl.
*B64C 27/50* (2006.01)
*B64C 27/10* (2006.01)
(Continued)

(52) U.S. Cl.
CPC ........... *B64C 27/50* (2013.01); *A63H 27/007* (2013.01); *A63H 27/12* (2013.01); *B64C 1/30* (2013.01);
(Continued)

(58) Field of Classification Search
CPC ... B64C 27/10; B64C 27/50; B64C 2201/024; B64C 2201/108; B64C 2201/20; B64C 2201/201; B64C 2201/28
See application file for complete search history.

(56) References Cited

U.S. PATENT DOCUMENTS 1,110,738 A 9/1914 Berecz
1,479,163 A 5/1922 Tyrell
(Continued)

FOREIGN PATENT DOCUMENTS

CN 201760105 U 3/2011
CN 104260605 A 1/2015
(Continued)

OTHER PUBLICATIONS

EP 19168177.4, Partial European Search Report, dated Oct. 1, 2019, European Patent Office.
(Continued)

*Primary Examiner* — Richard G Davis
(74) *Attorney, Agent, or Firm* — Millman IP Inc.

(57) ABSTRACT

A collapsible flying device is provided having a housing including first and second housing sections forming an enclosure, and a motorized assembly that includes a drive motor and a drive shaft driven by the drive motor. The drive shaft matingly receives the first housing section and is coupled to the second housing section, wherein operation of the drive motor drives the drive shaft to move the first housing section from a closed position adjacent the second housing section to an open position spaced from the second housing section. A rotor hub is rotatingly driven by the drive motor. At least two rotor blades are coupled thereto and positioned within the enclosure in a collapsed position when the first housing section is in the closed position, and extend beyond the enclosure in an expanded position when the first housing section is in the open position.

5 Claims, 10 Drawing Sheets

(51) Int. Cl.
*B64C 1/30* (2006.01)
*A63H 27/00* (2006.01)
*B64C 39/02* (2006.01)

(52) U.S. Cl.
CPC ............ *B64C 27/10* (2013.01); *B64C 39/024* (2013.01); *B64C 2201/024* (2013.01); *B64C 2201/042* (2013.01); *B64C 2201/108* (2013.01); *B64C 2203/00* (2013.01)

(56) References Cited

U.S. PATENT DOCUMENTS

| | | | |
|---|---|---|---|
| 1,445,402 A * | 2/1923 | Le Velle | ............... F04D 29/364 |
| | | | 416/87 |
| 2,079,942 A * | 5/1937 | Le Velle | ............... F04D 29/364 |
| | | | 416/87 |
| 2,783,584 A | 11/1954 | Venturella | |
| 3,204,891 A | 9/1965 | Cline | |
| D372,277 S | 7/1996 | Henley | |
| D377,058 S | 12/1996 | Henley | |
| 5,743,489 A * | 4/1998 | Stemme | ................. B64C 11/28 |
| | | | 244/59 |
| 6,550,715 B1 | 4/2003 | Reynolds et al. | |
| 6,550,719 B2 * | 4/2003 | Konig | .................... B64C 11/28 |
| | | | 244/16 |
| 6,976,653 B2 | 12/2005 | Perlo et al. | |
| D539,358 S | 3/2007 | Shi | |
| 7,273,195 B1 | 9/2007 | Golliher | |
| 7,416,466 B2 | 8/2008 | Isawa | |
| 7,789,341 B2 | 9/2010 | Arlton et al. | |
| 8,147,289 B1 | 4/2012 | Lee | |
| D664,214 S | 7/2012 | Yuen | |
| D697,145 S | 1/2014 | Wong | |
| 8,851,841 B2 * | 10/2014 | Care | ..................... F04D 29/366 |
| | | | 416/5 |
| 8,888,035 B2 | 11/2014 | Lind, Jr. et al. | |
| D740,376 S | 10/2015 | Rehkemper | |
| 10,054,939 B1 | 8/2018 | Applewhite | |
| 10,112,694 B2 | 10/2018 | Yan | |
| 10,259,573 B2 | 4/2019 | Cai | |
| D868,902 S | 12/2019 | Zhong | |
| 2004/0245376 A1 | 12/2004 | Muren | |
| 2007/0012818 A1 | 1/2007 | Miyazawa | |
| 2007/0018033 A1 | 1/2007 | Arlton et al. | |
| 2008/0245924 A1 | 10/2008 | Arlton et al. | |
| 2016/0001879 A1 * | 1/2016 | Johannesson | ........... B64C 27/50 |
| | | | 416/142 |
| 2016/0167778 A1 | 6/2016 | Meringer et al. | |
| 2017/0182901 A1 | 6/2017 | Lee et al. | |
| 2018/0093753 A1 | 4/2018 | Chow | |
| 2018/0257769 A1 * | 9/2018 | Goldstein | ............... B64C 27/50 |
| 2019/0055003 A1 * | 2/2019 | Luo | .................... B64C 11/28 |
| 2019/0071178 A1 * | 3/2019 | Caubel | .................. B64C 39/024 |

FOREIGN PATENT DOCUMENTS

| | | |
|---|---|---|
| CN | 205131639 U | 4/2016 |
| CN | 106741911 A | 5/2017 |
| CN | 206404302 U | 8/2017 |
| JP | 3207604 U | 10/2016 |
| KR | 10-2016-0052238 A | 5/2016 |
| WO | 2010027801 A2 | 3/2010 |

OTHER PUBLICATIONS

Office Action dated Mar. 18, 2020 in connection with Design U.S. Appl. No. 29/680,449.

* cited by examiner

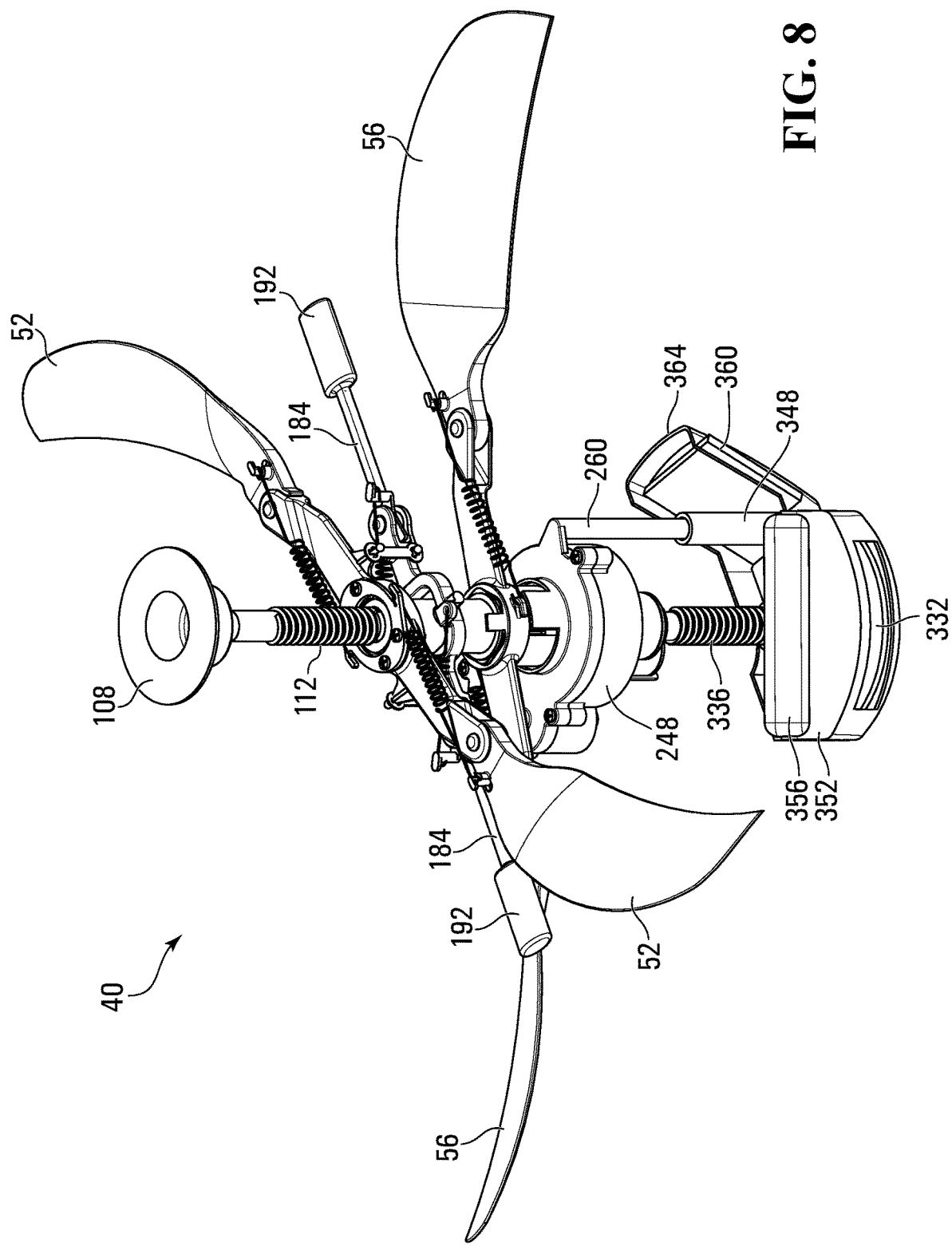

COLLAPSIBLE FLYING DEVICE

CROSS-REFERENCE TO RELATED APPLICATIONS

This application is a divisional of U.S. application Ser. No. 15/992,038, filed May 29, 2018, the contents of which are incorporated herein by reference in their entirety.

FIELD

The specification relates generally to a flying device. In particular, the following relates to a collapsible flying device.

SUMMARY OF THE DISCLOSURE

In one aspect, there is provided a collapsible flying device, comprising: a housing, having a first housing section, and a second housing section forming an enclosure with the first housing section; and a motorized assembly having: a drive motor arrangement including at least one drive motor, a drive shaft driven by the drive motor arrangement, the drive shaft matingly receiving the first housing section and being coupled to the second housing section, wherein operation of the drive motor arrangement drives the drive shaft to move the first housing section from a closed position adjacent the second housing section to an open position spaced from the second housing section, a rotor hub rotatingly driven by the drive motor arrangement, and at least two rotor blades coupled to the rotor hub and positioned within the enclosure in a collapsed position when the first housing section is in the closed position, the at least two rotor blades extending beyond the enclosure in an expanded position when the first housing section is in the open position, the at least two rotor blades being rotated by the drive motor arrangement to provide lift to the collapsible flying device.

The collapsible flying device can further have a housing rotation restriction structure coupled to the first housing section and the second housing section and inhibiting rotation of the first housing section relative to the second housing section about a rotation axis of the drive shaft, wherein the drive shaft has a threaded section and the first housing section has a complementary threaded section such that rotation of the drive shaft moves the first housing section relative to the second housing section along the rotation axis.

The drive motor arrangement may include one drive motor.

The collapsible flying device can further have a motor rotation restriction structure coupled to the second housing section and the drive motor and inhibiting rotation of the drive motor relative to the second housing section about the rotation axis of the drive shaft. The rotor hub can be mounted on the drive shaft.

At least one of the drive shaft and the first housing section can have a threadless section wherein, when one of the threaded section on the drive shaft and the threaded section on the first housing section is positioned axially on the threadless section, and the drive shaft rotates freely relative to the first housing section.

The collapsible flying device can further include a retainer feature limiting axial separation of the first housing section and the second housing section relative to the rotation axis of the drive shaft.

The collapsible flying device can further include a biasing member biasing the first housing section axially towards the first housing section when the threadless section is positioned axially on the one of the threaded section of the drive shaft and the threaded section of the first housing section.

The drive shaft can be a first drive shaft and the collapsible flying device can further include a second drive shaft rotatingly driven in a second rotational direction opposite to a first rotational direction in which the first drive shaft is simultaneously driven by the drive motor arrangement, and at least two rotor blades coupled to the second drive shaft and rotating therewith.

The second housing section can have a complementary threaded section such that rotation of the drive shaft translates the second housing section relative to the drive shaft along the rotation axis. At least one of the drive shaft and the first housing section can have a first threadless section and at least one of the drive shaft and the second housing section can have a second threadless section, wherein, when one of the threaded section on the drive shaft and the threaded section on the first housing section is positioned axially on the first threadless section and when one of the threaded section on the drive shaft and the threaded section on the second housing section is positioned axially on the second threadless section, the drive shaft rotates freely relative to the first housing section and the second housing section. The collapsible flying device can further include a retainer feature limiting axial separation of the first housing section and the second housing section relative to the rotation axis of the drive shaft.

In another aspect, there is provided a collapsible flying device, comprising: a drive motor; a drive shaft rotatingly driven by the drive motor; a rotor hub extending from the drive shaft to be rotated therewith by the drive motor; and at least two rotor blades coupled to the rotor hub enabling pivoting of each of the at least two rotor blades through a pivot range between a collapsed position in which the rotor blade is oriented towards the rotor hub, and an expanded position in which the rotor blade is oriented away from the rotor hub, wherein each of the at least two rotor blades is stable in the collapsed position and the expanded position when the drive shaft is rotated at a constant rotational speed.

The collapsible flying device can further include at least one biasing element coupled to the at least two rotor blades, the at least one biasing element biasing the at least two rotor blades towards the collapsed position when the at least two rotor blades are in a first section of the pivot range adjacent to the collapsed position and biasing the at least two rotor blades towards the expanded position when the at least two rotor blades are in a second section of the pivot range adjacent to the expanded position.

Each of the at least one biasing element can be an elastic member connected to a biasing point on one of the at least two rotor blades and a corresponding base point on the rotor hub, wherein a distance between the corresponding base point and the biasing point has a local maximum when the one of the at least two rotor blades is between the first section and the second section of the pivot range. The elastic member can be an extension spring.

The collapsible flying device can further include a controller controlling operation of the drive motor, the controller sufficiently accelerating rotation of the drive shaft and the rotor hub in a rotational direction when the at least two rotor blades are in the extended position to cause each of the at least two rotor blades to pivot towards the collapsed position and past the local maximum to cause the at least two rotor blades to be biased towards the collapsed position by the elastic member. The rotational direction can be a first rotational direction, and the controller can sufficiently accelerate the rotation of the drive shaft and the rotor hub in a second rotational direction opposite the first rotational direction to cause each of the at least two rotor blades to pivot towards the extended position and past the local maximum to cause the at least two rotor blades to be biased towards the extended position by the elastic member.

BRIEF DESCRIPTIONS OF THE DRAWINGS

For a better understanding of the various embodiments described herein and to show more clearly how they may be carried into effect, reference will now be made, by way of example only, to the accompanying drawings in which:

FIG. 8 shows a top side perspective view of the motorized assembly of FIG. 3 in the expanded state.

DETAILED DESCRIPTION

Figure 1:
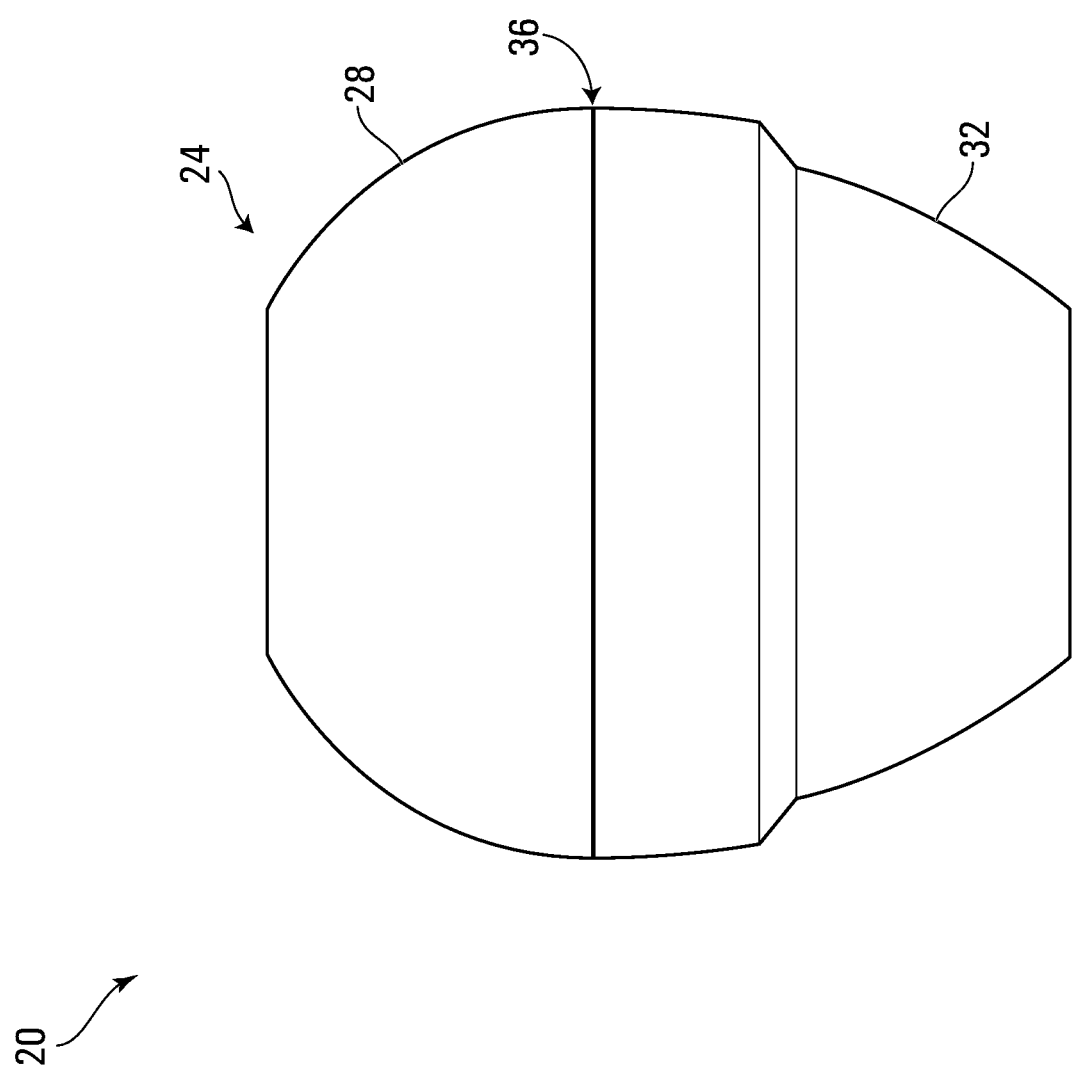
FIG. 1 is a side elevation view of a collapsible flying device in accordance with one embodiment thereof in a collapsed state.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

A collapsible flying device 20 in accordance with an embodiment is shown in FIG. 1. The collapsible flying device 20 has a somewhat ovoid housing 24 formed from an upper housing section 28 having an upper shell 30 and a lower housing section 32 having a lower shell 34 that are shown in a collapsed state, in which the upper housing section 28 is in a closed position relative to and abuts the lower housing section 32. The upper housing section 28 and the lower housing section 32 are formed of any suitably resilient material, such as a plastic. As shown, the upper housing section 28 and the lower housing section 32 mate to generally seal about a seal line 36. The upper housing section 28 and the lower housing section 32 are generally hollow, and define an enclosure between them. The upper housing section 28 and the lower housing section 32 can be provided with ornamentation to provide a particular appearance, such as a character, an animal, or an object. In a particular implementation, the upper housing section 28 and the lower housing section 32 are decorated so that the collapsible flying device has the appearance of a bird, and in particular an owl.

Figure 2:
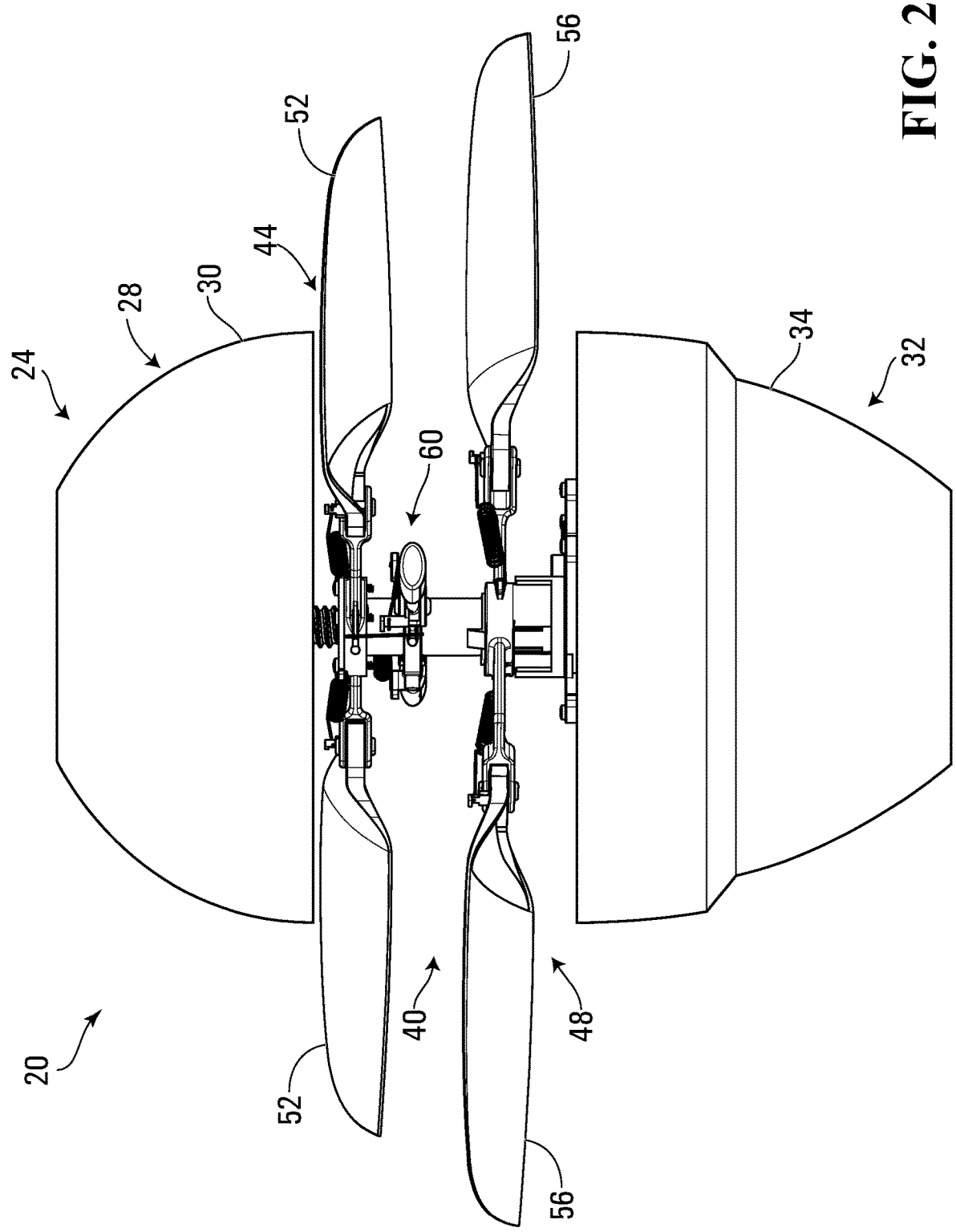
FIG. 2 is a side elevation view of the collapsible flying device of FIG. 1 in an expanded state.

FIG. 2 shows the collapsible flying device 20 in an expanded state, wherein the first housing section 28 is in an open position relative to the lower housing section 32 in which the upper housing section 28 is spaced apart from the lower housing section 32 to open the enclosure defined therebetween. The open housing 24 exposes a motorized assembly 40 that extends from the enclosure to outside of the housing 24. The motorized assembly 40 is in a collapsed state and enclosed in the enclosure when the housing 24 is in a collapsed state, with the upper housing section mating with the lower housing section 32, as shown in FIG. 1, but expands to an expanded state shown in FIG. 2.

The motorized assembly 40 includes an upper rotor assembly 44 and a lower rotor assembly 48. The upper rotor assembly 44 includes a set of upper rotor blades 52, and the lower rotor assembly 48 includes a set of lower rotor blades 56. Further, a flybar assembly 60 is used to stabilize the upper rotor assembly 44. As will be understood, when the collapsible flying device 20 is in an expanded state, the sets of upper and lower rotor blades 52, 56 and a flybar of the flybar assembly 60 extend out of the housing 24 to provide lift to the collapsible flying device 20. Lift is provided by the rotation of the upper rotor assembly 44 in a first rotational direction, and of the second rotor assembly 48 in a second rotational direction to counter the torque of the upper rotor assembly 44.

The motorized assembly 40 manages the expansion and collapsing of the motorized assembly 40 and, thus, the flying device 20. In particular, the motorized assembly 40 controls the opening and closing of the housing 24 by separating the upper housing section 28 from the lower housing section 32, as will be explained hereinbelow. In addition, the motorized assembly 40 controls the expansion and collapse of the upper and lower rotor assemblies 44, 48, and their rotation to generate lift, also as will be explained hereinbelow.

Figure 3:
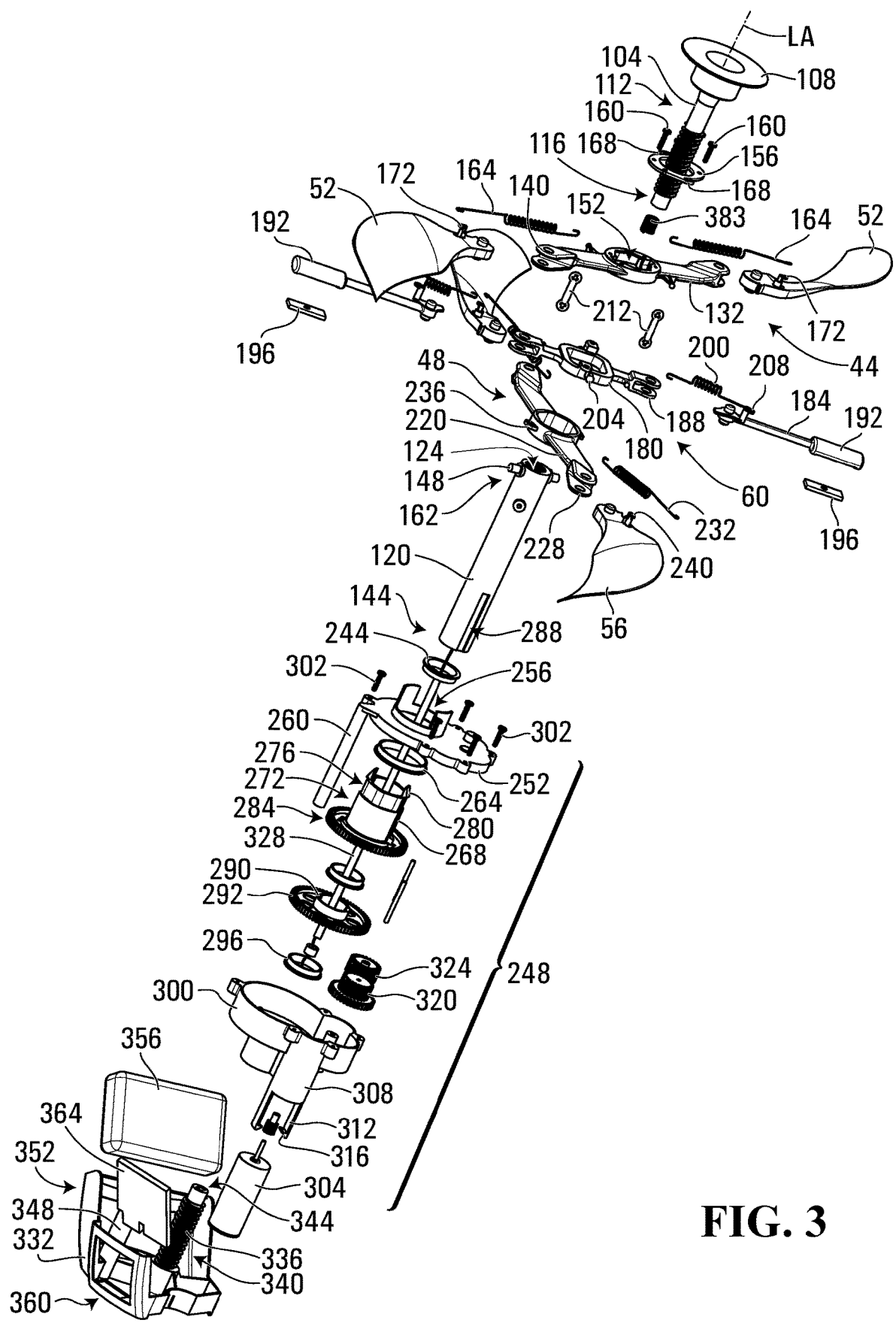
FIG. 3 is an exploded section view of a motorized assembly of the collapsible flying device of FIGS. 1 and 2.

FIG. 3 shows the motorized assembly 40 used in the collapsible flying device 20, together with elements of upper and lower housing sections. The upper housing section 28 includes an upper threaded rod 104 that has a rod cap 108 for securing the upper threaded rod 104 to the upper shell 30 via an epoxy or other suitable adhesive or interlocking mechanism. The upper threaded rod 104 has a threaded section 112 and is terminated with a threadless section 116.

The upper threaded rod 104 is received within a drive shaft in the form of an upper rotor shaft 120 of the motorized assembly 40. The upper rotor shaft 120 acts as a drive shaft for both driving the collapsing and expansion of the housing 24 and the upper and lower rotor blades 52, 56, as well as driving the rotation of the upper and lower rotor blades 52. The upper rotor shaft 120 has an internal through-hole 124 that is coaxial with the rotation axis, which is a central longitudinal axis LA, of the upper rotor shaft 120. Threading of a threaded section of the upper rotor shaft 120 within the internal through-hole 124 complements the threading of the threaded section 112 of the upper threaded rod 104.

The upper rotor assembly 44 is mounted on the upper rotor shaft 120. The upper rotor assembly 44 includes an upper rotor hub 132 having a central through-hole that is larger in diameter than the outer diameter of the upper rotor shaft 120 in which the upper rotor shaft 120 is received. The two upper rotor blades 52 are pivotally coupled to the upper rotor hub 132 via brackets 140 of the upper rotor hub 132. In particular, the upper rotor blades 52 pivot about pivot axes that are generally parallel to the longitudinal axis LA of the upper rotor shaft 120, and therefore pivot in a plane that is perpendicular to the longitudinal axis LA. The shapes of the brackets 140 of the upper rotor hub 132 and the upper rotor blades 52 provide the upper rotor blades 52 with a pivot range between a collapsed position in which the upper rotor blades 52 are oriented towards the upper rotor hub 132 and an expanded position in which the upper rotor blades 52 are oriented away from the upper rotor hub 132. The upper rotor hub 132 is mounted on the upper rotor shaft 120 at a lower end 144 thereof and slid upwards thereover. Two projections 148 on the outside of the upper rotor shaft 120 are received within recesses 152 of the upper rotor hub 132. A top hub retainer plate 156 is secured to the upper rotor hub 132 over the projections 148 via a set of small spin heli screws 160. The top hub retainer plate 156 and the upper rotor hub 132, when secured together, remain secured to the projections 148 pivotally about an axis thereof at an upper end 162 of the upper rotor shaft 120. When the upper rotor shaft 120 is rotated, the projections 148 secured within the recesses of the upper rotor hub 132 urge the upper rotor assembly 44 to rotate with it.

A first end of two biasing elements in the form of blade extension springs 164 are hooked onto base points in the form of anchor hooks 168 on the sides of the top hub retainer plate 156, and a second end of the two blade extension springs 164 are cooked onto biasing points in the form of anchor hooks 172 atop of the upper rotor blades 52. As will be described hereinbelow, the blade extension springs 164 bias the upper rotor blades 52 to enable the upper rotor blades 52 to be held in and controllably pivoted between the collapsed position and the expanded position.

A flybar assembly 60 is also mounted on the upper rotor shaft 120, and includes a flybar hub 180 having a central through-hole that is larger in diameter than the outer diameter of the upper rotor shaft 120 in which the upper rotor shaft 120 is received. Two flybars 184 are pivotally coupled to the flybar hub 180 via brackets 188 of the flybar hub 180. In particular, the flybars 184 pivot about pivot axes that are generally parallel to the longitudinal axis LA of the upper rotor shaft 120, and therefore pivot in a plane that is perpendicular to the longitudinal axis LA. Each flybar 184 has a flybar end 192 bearing a flybar weight 196 inserted therein to provide inertia to the flybar end 192. The shapes of the brackets 188 of the flybar hub 180 and the flybars 184 provide the flybars 184 with a relatively liberal pivot range. A first end of two biasing elements in the form of flybar extension springs 200 are hooked onto base points in the form of anchor hooks 204 on the sides of the flybar hub 180 and a second end of the two flybar extension springs 200 are hooked onto biasing points in the form of anchor hooks 208 atop of the flybars 184. As will be described hereinbelow, the flybar extension springs 200 bias the flybars 184 to enable the flybars 184 to stabilize rotation of the upper rotor blades 52.

The flybar assembly 60 is coupled to the upper rotor assembly 44 via a pair of flybar links 212 to stabilize operation of the upper rotor assembly 44.

The lower rotor assembly 48 is mounted on the upper rotor shaft 120 below the upper rotor assembly 44 and the flybar assembly 60. The lower rotor assembly 48 includes a lower rotor hub 220 having a central through-hole that is larger in diameter than the outer diameter of the upper rotor shaft 120 in which the upper rotor shaft 120 is received. The two lower rotor blades 56 are pivotally coupled to the lower rotor hub 220 via brackets 228 of the lower rotor hub 220. In particular, the lower rotor blades 56 pivot about pivot axes that are generally parallel to the longitudinal axis LA of the upper rotor shaft 120, and therefore pivot in a plane that is perpendicular to the longitudinal axis LA. The shapes of the brackets 228 of the lower rotor hub 220 and the lower rotor blades 56 provide the lower rotor blades 56 with a pivot range between a collapsed position in which the lower rotor blades 56 are oriented towards the lower rotor hub 220 and an expanded position in which the lower rotor blades 56 are oriented away from the lower rotor hub 220. A first end of two biasing elements in the form of blade extension springs 232 are hooked onto base points in the form of anchor hooks 236 on the sides of the lower rotor hub 220, and a second end of the blade extension springs 232 are hooked onto biasing points in the form of anchor hooks 240 atop of the lower rotor blades 56. As with the blade extension springs 164, the blade extension springs 232 bias the lower rotor blades 56 to enable the lower rotor blades 56 to be held in and controllably pivoted between the collapsed position and the expanded position.

A bearing 244 made of metal or another suitable material is mounted on the upper rotor shaft 120.

The upper motor shaft 120 interfaces with a gear box 248 that includes a gear box top 252 having an opening 256 on its top surface. A motor rotation restriction structure in the form of an alignment post 260 extends towards the lower housing section 28. A lower rotor bearing 264 is inserted into the opening 256 from underneath, and is made of a metal or other suitable material. A drive shaft in the form of a lower rotor shaft 268 has a sleeve 272 that fits within the lower rotor bearing 264 and extends towards the upper housing section 28 through the opening 256 in the gear box top 252. In this position, the lower rotor shaft 268 has a longitudinal axis extending through and defined by the sleeve that is coaxial with the longitudinal axis LA of the upper rotor shaft 120. In some embodiments, the upper rotor shaft 120 can be considered a first drive shaft and the lower rotor shaft 268 can be considered a second drive shaft. An annular recess 276 encircles the sleeve 272 towards an upper end thereof, and is crowned with two clips 280. The annular recess 276 is dimensioned to receive the lower rotor hub 220, which is then secured in the annular recess 276 via the clips 280. A lower rotor gear 284 extends radially at a lower end of the lower rotor shaft 268. The upper rotor shaft 120 has two axially extending grooves 288 at the lower end 144 thereof that receive two ridges within an axially extending aperture within a sleeve 290 of an upper rotor gear 292. The axially extending grooves 288 and the ridges cooperate to fix the upper rotor shaft 120 rotationally about the longitudinal axis LA relative to the upper rotor gear 292. A bearing 296 is mounted within the axially extending aperture of the upper rotor gear 292 from underneath. The lower rotor gear 284 and the upper rotor gear 292 are received within a gear box housing 300 and coaxially aligned with the longitudinal axis LA, with the lower rotor gear 284 being positioned above the upper rotor gear 292. The gear box housing 300 is secured to the gear box top 252 via a set of screws 302.

A drive motor 304 is mounted within a motor bracket 308 of the gear box housing 300. The motor bracket 308 has a pair of clips 312 to securely retain the drive motor 304 therein. A geared torque shaft 316 extends from the drive motor 304 into the gear box housing 300. The geared torque shaft 316 interfaces with a stepped gear 320 within the gear box 248. When the geared torque shaft 316 rotates in a first rotational direction, the stepped gear 320 is rotated in a second rotational direction opposite the first rotational direction. In turn, the stepped gear 320 rotates a rotational direction reversal gear 324 in the gear box 248 in the first rotational direction. The stepped gear 320 meshes with the upper rotor gear 292, and the rotational direction reversal gear 324 meshes with the lower rotor gear 284 to drive the upper rotor shaft 120 and the lower rotor shaft 268 to rotate in opposing rotational directions about the longitudinal axis LA.

A square profiled center shaft 328 extends axially through the motorized assembly 40. The upper rotor shaft 120 has a through-hole with a circular profile through which the center shaft 328 extends. The upper threaded rod 104 has an aperture with a square profile in which the center shaft 328 is received at a top end thereof. The corresponding non-circular profiles of the center shaft 328 and the aperture of the upper threaded rod 104 inhibit rotation of the upper housing section 28 relative to the center shaft 328.

A lower mount 332 of the lower housing assembly 32 is secured to an inside surface of the lower shell 34 via epoxy or another suitable method, and has a lower threaded rod 336 that extends towards the upper housing section 28 coaxially with the longitudinal axis LA. The lower threaded rod 336, like the upper threaded rod 104, has a threaded section 340 and is terminated with a threadless section 344 at its upper end. In some embodiments, the threadless section 116 can be a first threadless section and the threadless section 344 can be a second threadless section. The lower threaded rod 336 is received within the internal through-hole 124 of the upper rotor shaft 120 of the motorized assembly 40. Threading of the threaded section of the upper rotor shaft 120 within the internal through-hole 124 complements the threading of the threaded section 340 of the lower threaded rod 336.

A rotation alignment guide 348 of the lower mount 332 extends upwardly towards the upper housing section 28. The alignment guide 348 is a sleeve that has an aperture for receiving the alignment post 260 of the gear box 248. The rotation alignment guide 348 and the alignment post 260 act as a motor rotation restriction structure that couples the drive motor 304 to the second housing section 32 to inhibit rotation of the drive motor 304 relative to the second housing section 32 about the rotation axis (that is, the longitudinal axis LA) of the upper rotor shaft 120. Insertion of the alignment post 260 of the gear box 248 maintains the rotational orientation of the gear box 248, and thus the drive motor 304, about the longitudinal axis LA relative to the upper housing section 28 and the lower housing section 32. As a result, torque force applied by the drive motor 304 through the gear box 248 is directly applied to the upper rotor shaft 120 and the lower rotor shaft 268 to rotate the upper rotor shaft 120 in a first rotational direction relative to the housing 24 and to rotate the lower rotor shaft 268 in a second rotational direction relative to the housing 24 and opposite the first rotational direction.

A battery bracket 352 of the lower mount 332 is dimensioned to receive a battery 356 that powers the drive motor 304 via electrical wiring extending between them (not shown). A board bracket 360 of the lower mount 332 is dimensioned to receive a printed circuit board ("PCB") 364 that provides a controller for controlling operation of the drive motor 304 by controlling the electricity dispensed by the battery 356 being provided to the drive motor 304 and, thus, operation of the collapsible flying device 20.

The lower threaded rod 336 has an aperture that is axial to its length and has a square profile to receive the center shaft 328 and inhibit rotation thereof relative to the lower threaded rod 336.

The non-circular profiled center shaft 328 and the correspondingly profiled apertures in the upper threaded rod 104 and the lower threaded rod 336 provide a housing rotation restriction structure that inhibits rotation of the first housing section relative to the second housing section about the rotation axis (that is the longitudinal axis LA) of the upper rotor shaft 120.

Figure 4:
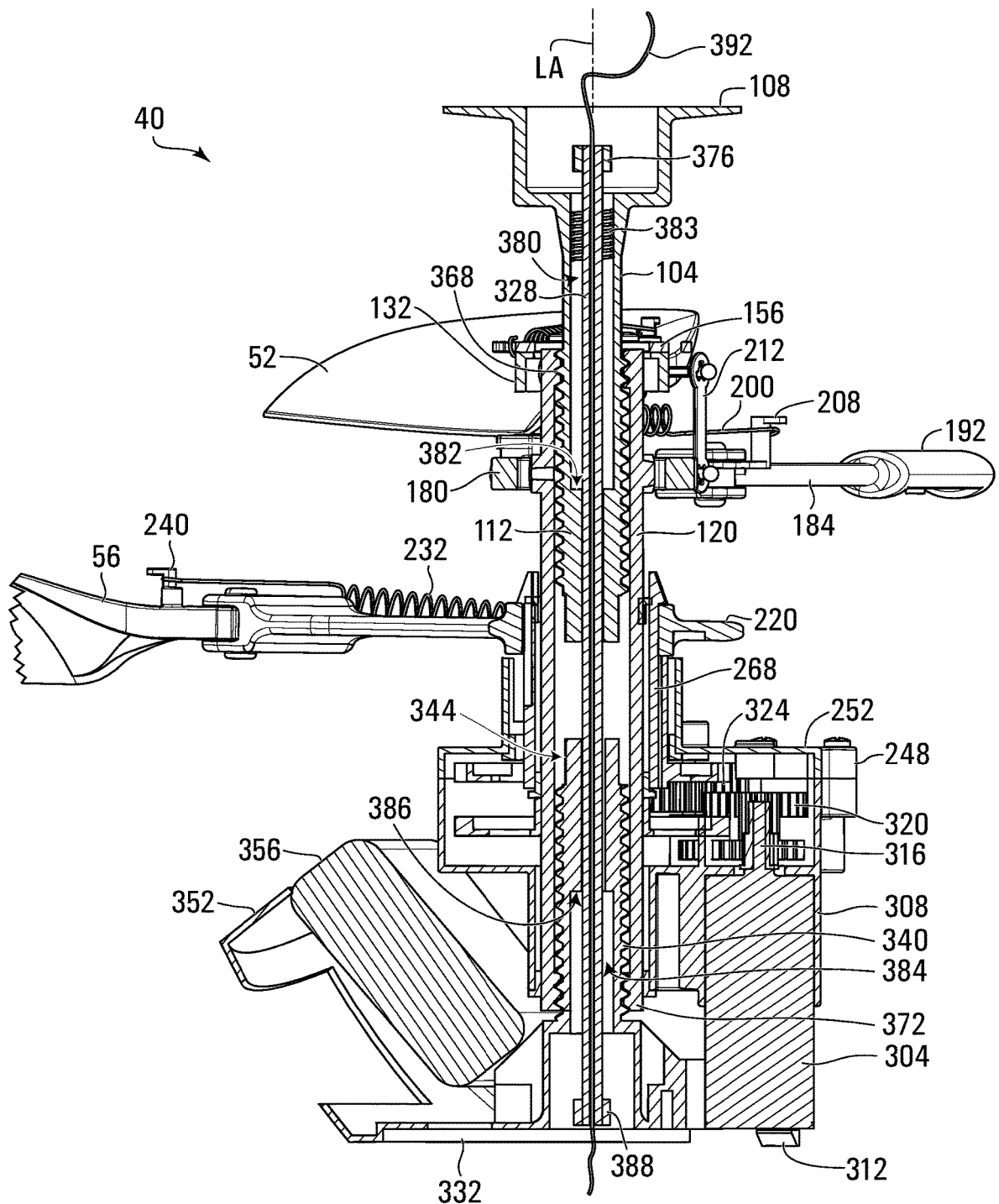
FIG. 4 shown a partial section view of the motorized assembly of FIG. 3 in the partially collapsed state.

FIG. 4 shows the motorized assembly 40 in a partially collapsed state, as it would be in the closed housing 24 as shown in FIG. 1. As shown, the upper rotor shaft 120 has a first threaded section 368 within the internal through-hole 124 at the upper end 162 thereof whose threading corresponds to the threaded section 112 of the upper threaded rod 104. In addition, the upper rotor shaft 120 has a second threaded section 372 within the internal through-hole 124 at the lower end 144 thereof whose threading corresponds to the threaded section 340 of the lower threaded rod 336. The center shaft 328 has an upper cap 376 secured on its upper end that extends within the upper threaded rod 104 and the rod cap 108. The upper threaded rod 104 has an aperture 380 of a larger profile than the center shaft 328 that extends axially from the upper end thereof and terminates with an internal surface 382 within the upper threaded rod 104. The upper cap 376 is dimensioned to slide axially through the aperture 380. A biasing member in the form of a coil spring 383 in an uncompressed state is positioned in the aperture 380 around the center shaft 328 below the upper cap 376. The lower threaded rod 336 has an aperture 384 of a larger profile than the center shaft 328 that extends axially from the lower end thereof and terminates with an internal surface 386 within the lower threaded rod 336. The center shaft 328 has a lower cap 388 secured on its lower end that extends within the lower threaded rod 336. The lower cap 388 is dimensioned to slide axially through the aperture 384.

An electrical wire set 392 extends through an axial through-hole in the center shaft 328 and is connected to the PCB 364 at a lower end and to one or more lights and/or electric motors on a top surface of the upper housing section 28. The lights and/or electric motors can be used, for example, to animate a character or animal represented by the collapsing flying device 20.

When the collapsible flying device 20 is in a collapsed state as shown in FIG. 1, the upper and lower housing sections 28, 32 are retracted together, with the upper shell 30 and the lower shell 34 abutting one another along their adjacent circumferential surface. The upper and lower rotor assemblies 44, 48 and the flybar assembly 60 are in a collapsed state with the upper and lower rotor blades 52, 56 being pivoted towards the upper rotor shaft 12.

Operation of the collapsible flying device 20 will now be described with reference to FIGS. 1 to 7C.

In order to cause the collapsible flying device 20 from the collapsed state to the expanded state shown in FIG. 2, in which it can fly, the controller of the PCB 364 controls the current provided from the battery 356 to the drive motor 304 to cause the drive motor 304 to rotate the geared torque shaft 316 in a first rotational direction. The geared torque shaft 316 meshes with the stepped gear 320 to cause it to rotate. The stepped gear 320, in turn, meshes with the upper rotor gear 292, causing it to rotate. In addition, the stepped gear 320 also meshes with the rotational direction reversal gear 324 to rotate it and the lower rotor gear 284 with which it meshes.

As the alignment post 260 of the gear box 300 is positioned within the rotation alignment guide 348 of the lower mount 332, the gear box 300 is restricted from rotating about the longitudinal axis LA relative to the lower housing section 32. Further, as the upper threaded rod 104 of the upper housing section 28 and the lower threaded rod 336 of the lower housing section 32 have apertures having a profile that restricts rotation relative to the square center shaft 328, the upper housing section 28 is restricted from rotation about the longitudinal axis LA relative to the lower housing section 32. Thus, the torque generated by the drive motor 304 is applied to rotate the upper rotor shaft 120 and the lower rotor shaft 268 relative to the upper housing section 28 and the lower housing section 32.

As the upper rotor shaft 120 is rotated relative to the lower threaded rod 336 and the upper threaded rod 104, the threading of the threaded section 112 of the upper threaded rod 104 and the first threaded section 368 of the rotating upper rotor shaft 120 cause the upper threaded rod 336 to move axially outward on the upper rotor shaft 120. Similarly, and simultaneously, the threading of the threaded section 340 of the lower threaded rod 336 and the second threaded section 372 of the rotating upper rotor shaft 120 cause the lower threaded rod 336 to move axially outward on the upper rotor shaft 120. As the upper threaded rod 104 and the lower threaded rod 336 extend outward on the upper rotor shaft 120, the apertures 380, 384 in the upper threaded rod 104 and the lower threaded rod 336 receive the upper cap 376 and the lower cap 388 respectively.

Figure 6:
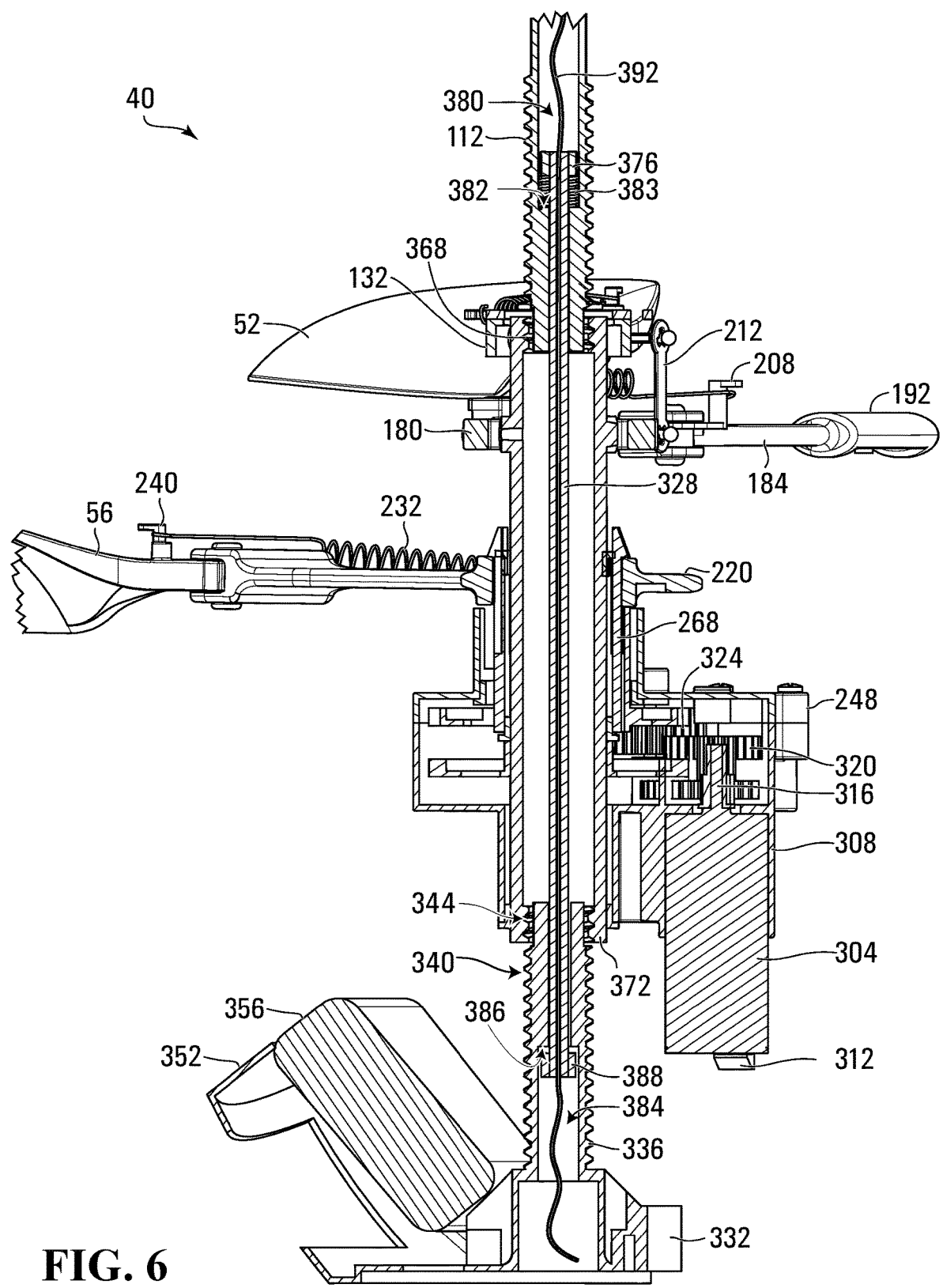
FIG. 6 shows a partial section view of the motorized assembly of FIG. 3 in the expanded state.

As the upper threaded rod 104 and the lower threaded rod 336 are secured to the upper housing section 28 and the lower housing section 32, the upper housing section 28 and the lower housing section 32 are separated until the first threaded section 368 is positioned over the threadless section 116 of the upper threaded rod 104 and the second threaded section 372 is positioned over the threadless section 344 of the lower threaded rod 336 in an expanded state, as shown in FIG. 6. At this point, continued rotation of the upper rotor shaft 120 causes the first and second threaded sections 368, 372 to rotate on the threadless sections 116, 344 of the upper and lower threaded rods 104, 336 respectively. The direction of the threads and the continued rotation of the upper rotor shaft 120 prevents the threading of the respective sections from reengaging.

During expansion of the housing 24, the gear box 300 and thus the drive motor 304 shift axially along the longitudinal axis LA away from the lower mount 332, so that the gear box 300 and the drive motor 304 are positioned generally centrally between the upper housing section 28 and the lower housing section 32 and the spacing therebetween.

Figure 5A:
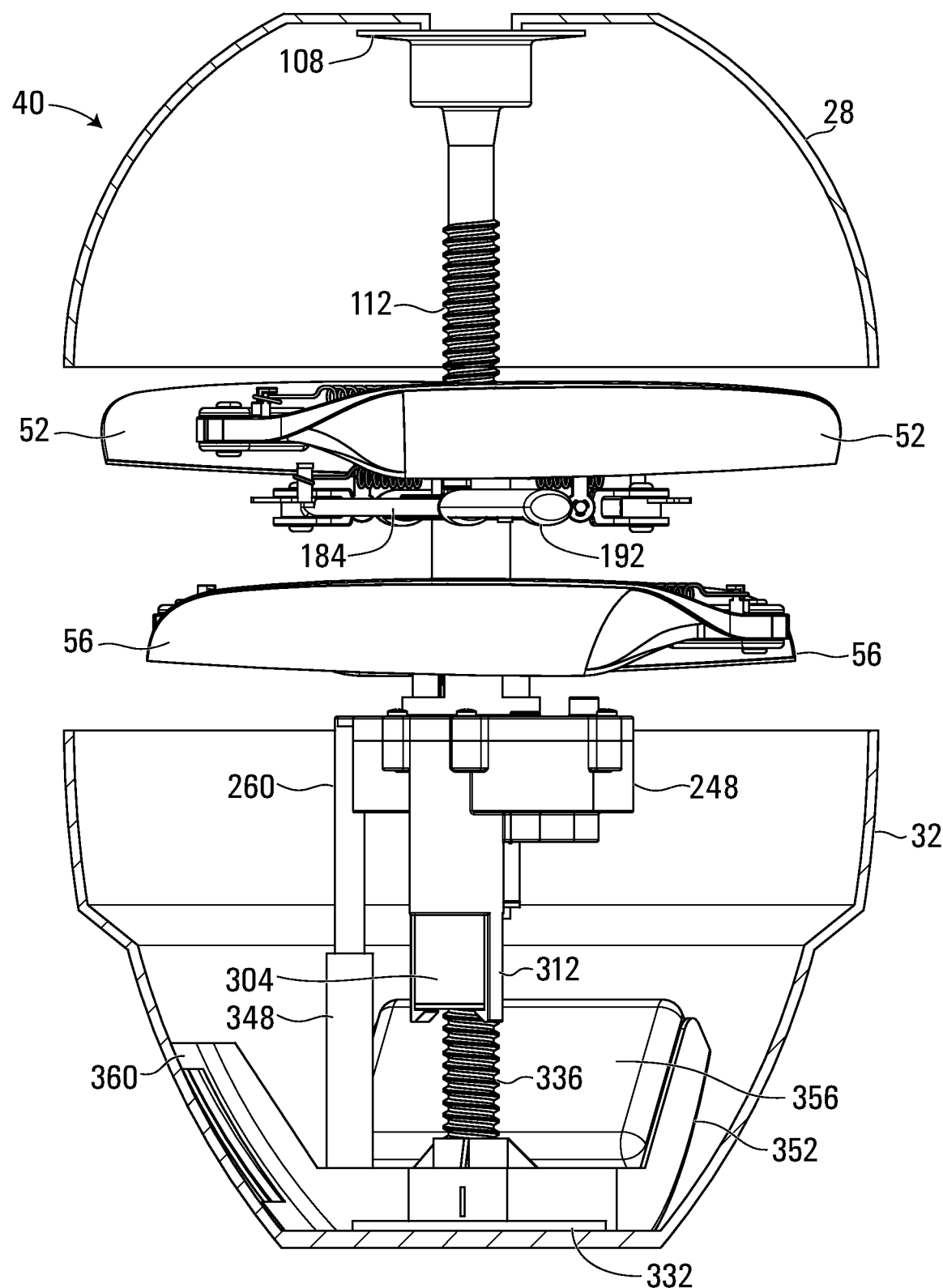
FIG. 5A shows a side elevation view of the motorized assembly of FIG. 3 in a partially expanded state inside of the housing with a portion of the housing broken away.
Figure 5B:
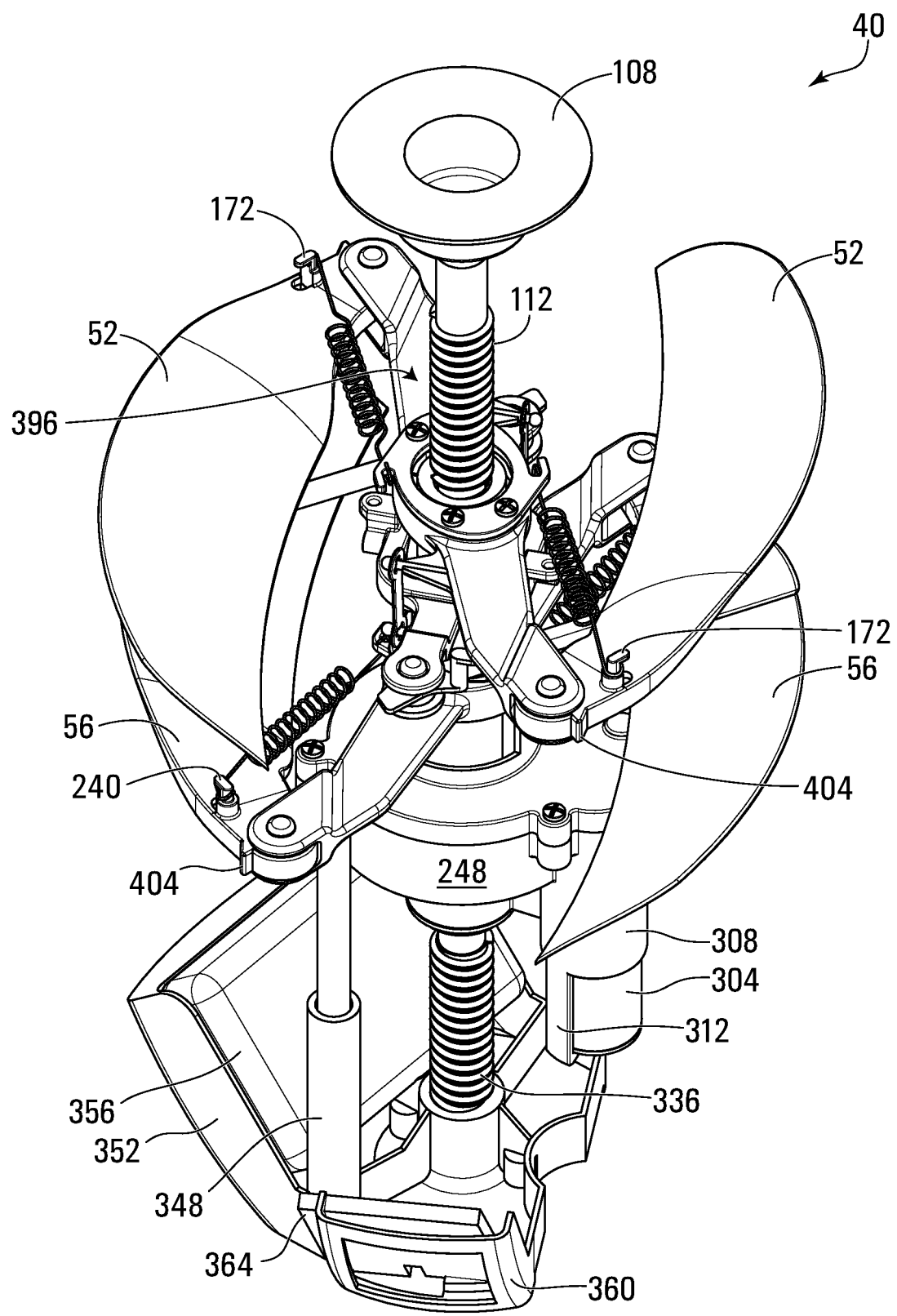
FIG. 5B shows a top side perspective view of the motorized assembly of FIG. 3 in the partially expanded state.

FIGS. 5A and 5B show the collapsible flying device 20 and the motorized assembly 40 are in a partially expanded state. As the positions of the upper cap 376 and the lower cap 388 along the length of the center shaft 328 are fixed, the lower cap 388 abuts against the internal surface 386 within the aperture 384 of the lower threaded rod 336 and the coil spring 383 is compressed slightly between the upper cap 376 and the internal surface 382 of the aperture 380 of the upper threaded rod 104. In its compressed state, the coil spring 383 applies a slight downward force on the upper threaded rod 104.

As the housing 24 is opening or when it is opened, in order to fly, the upper and lower rotor blades 52, 56 are moved from a collapsed position in which the upper and lower rotor blades 52, 56 are oriented towards the rotor hubs 132, 220 to an expanded position in which the upper and lower rotor blades 52, 56 are oriented away from the rotor hubs 132, 220.

Figure 7A:
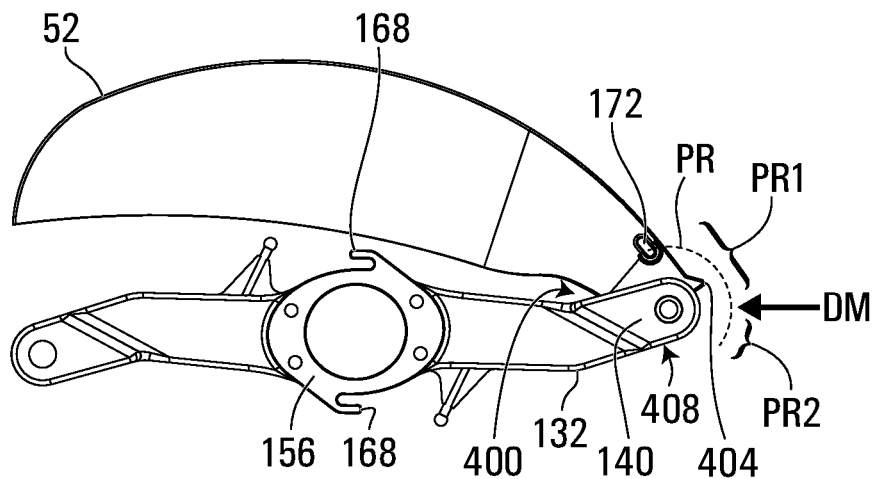
FIG. 7A is a plan view of one of the rotor blades of the upper rotor assembly of the collapsible flying device of FIGS. 1 to 6 in a collapsed position relative to the upper rotor hub.

FIGS. 5B and 7A show the position of an upper rotor blade 52 relative to the upper rotor hub 132 when the upper rotor blade 52 is in a collapsed position. The upper rotor blade 52 is pivotally coupled to the upper rotor hub 132 at the bracket 140 and can pivot through a pivot range PR. The pivot range PR is delimited by abutment of a trailing abutment surface 396 of the upper rotor blade 52 with an internal abutment surface 400 of the bracket 140. In addition, the upper rotor blade 52 has a limiter ridge 404, and the bracket 140 has a lateral surface 408. As previously noted, the upper rotor blade 52 is biased by the blade extension spring 164 (not shown in FIG. 7A) that extends between the anchor hook 168 on the upper rotor hub 132 and the anchor hook 172 on the upper rotor blade 52. The blade extension spring 164 is an elastic member that applies a tensile force that increases and decreases as the length of the blade extension spring 164 is increased and decreased respectively.

As the upper rotor blade 52 pivots through the pivot range PR, which also represents a path of the anchor hook 172 on the upper rotor blade 52, the distance between the anchor hook 168 on the upper rotor hub 132 and the anchor hook on the upper rotor blade 52 increases towards a position DM on either side of the position DM. The position DM defines the local maximum distance between the anchor hook 168 on the upper rotor hub 132 and the anchor hook 172 on the upper rotor blade 52. Thus, when the anchor hook 172 on the upper rotor blade 52 is in a first section PR1 of the pivot range PR, the upper rotor blade 52 is biased towards the collapsed position to shorten the blade extension spring 164. When the anchor hook 172 on the upper rotor blade 52 is in a second section PR2 of the pivot range PR, the upper rotor blade 52 is biased towards the expanded position to shorten the blade extension spring 164. When the upper rotor blade 52 is in the collapsed position, the blade extension spring 164 pulls the upper rotor blade 52 into contact with the bracket 140 to hold the upper rotor blade 52 there.

The lower rotor blades 56 and the brackets 228 of the lower rotor hub 220 have corresponding limiter ridges and lateral surfaces limiting the pivot range of the lower rotor blades 56 relative to the brackets 228.

Figure 7B:
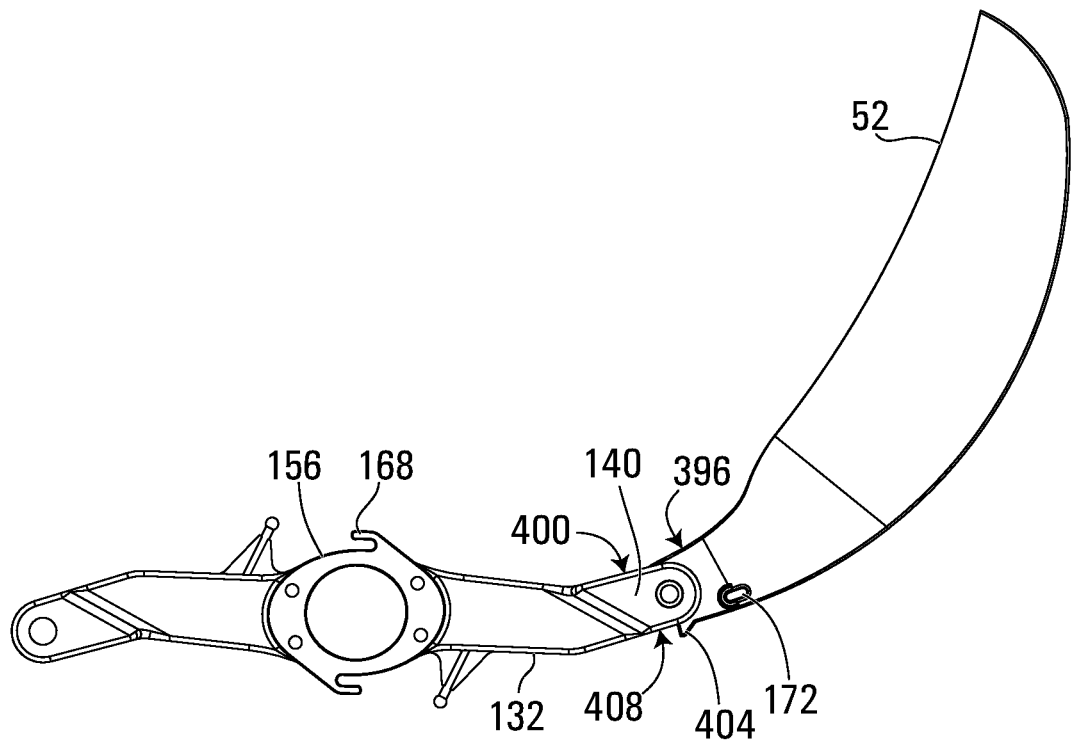
FIG. 7B shows the rotor blade of FIG. 7A after pivoting of the rotor blade to a position at which the distance between the anchor hook on the upper rotor hub and the anchor hook on the rotor blade is a local maximum.

FIG. 7B shows the upper rotor blade 52 in a position wherein the anchor hook 172 on the upper rotor blade 52 is at the position DM. At this position, the tensile force exerted by the blade extension spring 164 is greatest through the pivot range PR.

Figure 7C:
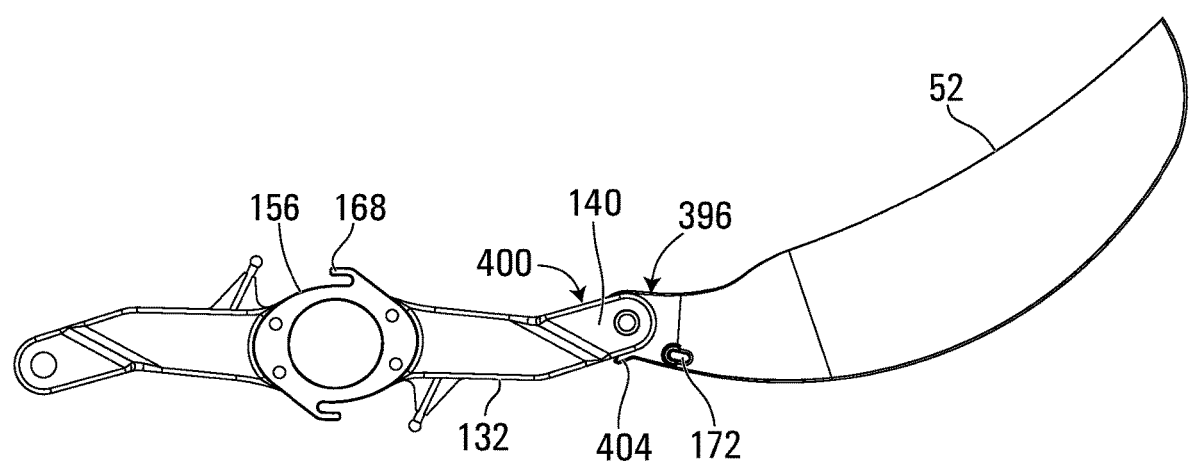
FIG. 7C shows the rotor blade of FIGS. 7A and B after pivoting of the rotor blade to an expanded position in which the rotor blade is oriented away from the upper rotor hub.

FIG. 7C shows the rotor blade 52 in the extended position. In this position, the tensile force of the blade extension spring 164 holds the upper rotor blade 52 in the extended position, as the tensile force of the blade extension spring 164 pulls the limiter ridge 404 of the upper rotor blade 52 into abutment with the lateral surface 408 of the bracket.

Once the housing 24 is expanded, the upper and lower rotor blades 52, 56, as well as the flybars 184, can be pivoted to extend out of the enclosure defined by the upper housing section 28 and the lower housing section 32 for flight. It is noted that the flybars 184 are coupled to the upper rotor blades 52 so that they are moved in tandem with the upper rotor blades 52.

In order to pivot the upper rotor blades 52 and the flybars 184, the controller operates the drive motor 304 to quickly accelerate the rotation of the upper rotor shaft 120 in a second rotational direction that is opposite of a first rotational direction in which the upper rotor blades 52 are rotated during flying. This is achieved either by quickly decelerating the rotation of the upper rotor shaft 120, such as by stopping the rotation of the upper rotor hub 132, slowing its rotation, or rotating the upper rotor hub 132 in the second rotational direction. The inertia of the upper rotor blades 52 causes them to continue to rotate in the first rotational direction while the upper rotor hub 132 is quickly accelerated in the second rotational direction. The inertia carries the upper rotor blades 52 through the first section PR1 of the pivot range PR, past the position DM, and into the second section PR2 of the pivot range PR, wherein the upper rotor blade 52 is pulled towards the expanded position by the blade extension spring 164.

The lower rotor blades 56 pivotally coupled to the lower rotor hub 220 are oriented so that they operate in the same manner as the upper rotor blades 52 of the upper rotor hub 132, but in an opposite rotational orientation. As the lower rotor hub 220 is rotated by the lower rotor shaft 268, which is operated at the same rate of rotation as the upper rotor shaft 120, but in the opposite rotational direction, the lower rotor blades 56 simultaneously operate like the upper rotor blades 52, but in the opposite rotational direction.

This rotational deceleration is achieved by control of the drive motor 304 by the controller on the PCB 364. For example, the controller can operate the drive motor 304 to rotate to cause the upper housing section 28 and the lower housing section 32 to move apart, and thereafter can quickly decelerate the drive motor 304 to cause the upper and lower rotor blades 52, 56 to move from the collapsed position to the expanded position. The interruption in continued rotational speed of the upper and lower rotor hubs 132, 220 can be momentary in order to cause the upper and lower rotor blades 52, 56 to achieve the expanded position, as shown in FIG. 2. Rotation of the drive motor 304 can thereafter be controlled by the controller as desired to control rotation of the extended upper and lower rotor blades 52, 56 for flight.

FIG. 8 shows the motorized assembly 40 in the expanded state.

In order to collapse the collapsible flying device 20, the controller operates the drive motor 304 to quickly accelerate the rotation of the upper rotor shaft 120 in the first rotational direction in which the upper rotor blades 52 are rotated during flying. The inertia of the upper rotor blades 52 causes them to lag behind the rotation of the upper rotor hub 132 while the upper rotor hub 132 is quickly accelerated in the first rotational direction. The inertia causes the upper rotor blades 52 to rotate through the second section PR2 of the pivot range PR, past the position DM, and into the first section PR1 of the pivot range PR, wherein the upper rotor blades 52 are pulled towards the collapsed position by the blade extension springs 164. As will be understood, the lower rotor blades 56 are simultaneously moved towards the collapsed position via the simultaneous acceleration of the lower rotor shaft 268 in the second rotational direction in the same manner.

Once the upper and lower rotor blades are moved towards the collapsed position, the controller can decelerate and reverse the rotational direction of the drive motor 304 to cause the upper threaded rod 104 and the lower threaded rod 336 to thread into the upper rotor shaft 120. The coil spring 383 urges the upper threaded rod 104 into the upper rotor shaft 120, and the weight of the motorized assembly 40 and the upper housing section 28 urges the upper rotor shaft 120 to engage the threading on the lower threaded rod 336. Rotation of the drive motor 304 in the reverse direction is continued until the upper and lower housing sections 28, 32 are pulled together to the collapsed state.

As will be understood, the upper and lower rotor blades 52, 56 are stable in both the collapsed position and the expanded position when the drive motor 304 and, thus, the upper and lower rotor shafts 120, 268 are operated at a generally constant rotational speed.

The controller can execute instructions stored in a storage on the PCB 364 for controlling the drive motor 304. Alternatively or additionally, the controller can receive instructions for controlling operation of the drive motor 304 via wired or wireless communications, such as RF. Further, the controller can control operation of the drive motor 304 in response to sensor input received from one or more sensors, such as light sensors and/or audio sensors and/or any other suitable types of sensors.

While, in the above-described embodiment, the collapsible flying device has two rotor assemblies, in other embodiments, the collapsible flying device can have one, or three or more rotor assemblies.

Alternatively, the rotor shafts can have threadless sections and the threaded rods extending from the upper and lower housing sections can be threaded until their ends.

The drive motor 304 may more broadly be referred to as a drive motor arrangement that includes at least one motor. In alternative embodiments, the drive motor arrangement includes a plurality of drive motors. In some of these alternative embodiments, one of the plurality of drive motors can drive the drive shaft that moves the upper and lower housing sections apart and another one of the plurality of drive motors can drive the upper and lower rotor assemblies.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. A collapsible flying device, comprising:
   a drive motor;
   a drive shaft rotatingly driven by the drive motor;
   a rotor hub extending from the drive shaft to be rotated therewith by the drive motor;
   at least two rotor blades coupled to the rotor hub enabling pivoting of each of the at least two rotor blades through a pivot range between a collapsed position in which the rotor blade is oriented towards the rotor hub, and an expanded position in which the rotor blade is oriented away from the rotor hub; and
   at least one biasing element coupled to the at least two rotor blades, the at least one biasing element biasing the at least two rotor blades towards the collapsed position when the at least two rotor blades are in a first section of the pivot range adjacent to the collapsed position and biasing the at least two rotor blades towards the expanded position when the at least two rotor blades are in a second section of the pivot range adjacent to the expanded position,
   wherein each of the at least two rotor blades is stable in the collapsed position and the expanded position when the drive shaft is rotated at a constant rotational speed.

2. The collapsible flying device as claimed in claim 1, wherein each of the at least one biasing element is an elastic member connected to a biasing point on one of the at least two rotor blades and a corresponding base point on the rotor hub, wherein a distance between the corresponding base point and the biasing point has a local maximum when the one of the at least two rotor blades is between the first section and the second section of the pivot range.

3. The collapsible flying device as claimed in claim 2, wherein the elastic member is an extension spring.

4. The collapsible flying device as claimed in claim 2, further comprising:
   a controller controlling operation of the drive motor, the controller sufficiently accelerating rotation of the drive shaft and the rotor hub in a rotational direction when the at least two rotor blades are in the extended position to cause each of the at least two rotor blades to pivot towards the collapsed position and past the local maximum to cause the at least two rotor blades to be biased towards the collapsed position by the elastic member.

5. The collapsible flying device as claimed in claim 4, wherein the rotational direction is a first rotational direction, and wherein the controller sufficiently accelerates the rotation of the drive shaft and the rotor hub in a second rotational direction opposite the first rotational direction to cause each of the at least two rotor blades to pivot towards the extended position and past the local maximum to cause the at least two rotor blades to be biased towards the extended position by the elastic member.

* * * * *